United States Patent
Grenz et al.

(10) Patent No.: US 6,407,672 B1
(45) Date of Patent: Jun. 18, 2002

(54) ADAPTIVE CPU COOLING FAN SPEED MONITOR DEVICE

(76) Inventors: Steven A. Grenz, 208 1st Ave. S, Jamestown, ND (US) 58401; Donald D. Harter, 105 Luray Ave., Johnstown, PA (US) 15904

( * ) Notice: Subject to any disclaimer, the term of this patent is extended or adjusted under 35 U.S.C. 154(b) by 0 days.

(21) Appl. No.: 09/313,920

(22) Filed: May 18, 1999

(51) Int. Cl.$^7$ .............................................. G08B 21/00
(52) U.S. Cl. ........................ 340/635; 340/507; 340/648; 340/659; 340/660; 361/687; 361/688
(58) Field of Search .................. 340/635, 507, 340/511, 945, 501, 638, 648, 659, 660; 361/687, 688, 695, 683; 701/500

(56) References Cited

U.S. PATENT DOCUMENTS

| | | | |
|---|---|---|---|
| 4,954,974 A | * 9/1990 | Howell, IV et al. | 701/100 |
| 5,448,143 A | * 9/1995 | Pecone | 318/434 |
| 5,491,610 A | 2/1996 | Mok et al. | 361/695 |
| 5,526,289 A | 6/1996 | Dinh et al. | 364/557 |
| 5,631,852 A | * 5/1997 | Chen | 701/100 |
| 5,714,938 A | 2/1998 | Schwabl | 340/584 |
| 5,727,928 A | * 3/1998 | Brown | 417/44.11 |
| 5,768,102 A | 6/1998 | Ma | 361/695 |
| 5,769,705 A | 6/1998 | O'Callaghan et al. | 454/184 |
| 5,790,430 A | 8/1998 | Steiert | 364/565 |
| 5,831,525 A | * 11/1998 | Harvey | 340/507 |

* cited by examiner

*Primary Examiner*—Edward Lefkowitz
*Assistant Examiner*—Davetta W. Goins
(74) *Attorney, Agent, or Firm*—Curtis V. Harr

(57) ABSTRACT

A device is provided which allows a personal computer user to monitor the operational parameters of the central processing unit's cooling fan. This device, called the CPU cooling fan speed monitor, characterizes the normal operating speed range of the CPU fan and the fan speed and provides warnings of improper fan speed. The fan speed monitor is a microcontroller-based device which has two principle modes of operation: the characterization mode; and the monitor mode. In the characterization mode, the fan speed monitor determines the "normal" operating speed range of the cooling fan. In the monitor mode, the fan speed monitor provides audible and visual indication of the operating speed of the CPU cooling fan.

16 Claims, 4 Drawing Sheets

ADAPTIVE CPU COOLING FAN SPEED MONITOR DEVICE

BACKGROUND OF THE INVENTION

The present invention relates to an improvement in the design of the cooling fan used in personal computers (herein after, PC) today to cool the central processing unit (herein after, CPU). More specifically, to the use of a fan speed monitor which constantly checks the rotational speed of the cooling fan and which will provide warnings of any improper operational variances.

A CPU cooling fan maintains the temperature of the CPU within safe limits. If the rotational speed of the fan slows to below a minimum value the CPU will overheat. A fan running at speeds in excess of a maximum value may indicate an impending fan failure which will lead to the overheating of the CPU. The result of overheating the CPU on the operation of the PC is unpredictable and often times will cause errors in the operation of the PC which may lead the user to blame bugs in the software. In certain systems fan failures or anomalies may even lead to permanent damage of the CPU. As system CPU's and the design of the fan or heat sinks used on the CPU can vary greatly, the minimum safe speed of the cooling fan may also vary on the make and model of the PC being used.

Current CPU fan detectors either operate on detecting the CPU temperature or on controlling the cooling fan speed and provide an indication of cooling fan failure after it has failed or the temperature of the CPU is too high. This is clearly an undesirable situation and some form of early detection of eminent cooling fan failure is needed.

Additionally, available CPU fan operation detectors do not have memory, which means that they can only indicate the current operating conditions of the cooling fan. This means that if the fan momentarily fails, for however long, and self corrects, this condition is not recognized by the operator unless he is present during this failure. This is also an undesirable situation and a system with memory which will alert the operator of such intermittent failures is needed.

SUMMARY OF THE INVENTION

It is the primary objective of the present invention to provide a method of monitoring the operation of a CPU cooling fan at all times that a PC is running.

It is an additional objective of the present invention to provide such a method which will warn a PC user of variances in the operation of the cooling fan.

It is still a further objective of the present invention to provide such a method of warning a PC user of such occurrences that contains a memory feature that will keep track of cooling fan variances which will enable a user to be aware of them whether or not they are using the machine during the time of the fan variance.

These objectives are accomplished by the use of a cooling fan monitor which provides an early warning of impending fan failure. The fan monitor is microprocessor based and has two operating modes: the characterization mode; and the monitor mode. When the present device is first used it will be in the characterization mode. In this mode data is gathered about the operating characteristics of the CPU fan. In the characterization mode, the microcontroller detects the normal operating range of the CPU fan, which is in general PC dependent. The fan speed monitor saves this information in nonvolatile memory for use during the monitor mode. Typically the cooling fan monitor will be left in the characterization mode for sufficent length of time to allow data to be gathered in both high use and low use time periods. The cooling fan monitor is then manually switched, by depressing a button, to the monitor mode. In the monitor mode, the fan speed monitor indicates whether the CPU cooling fan is operating within its normal operating range or if it is operating outside of this range. If the CPU cooling fan goes outside of this normal operating range, the fan speed monitor remembers this condition and indicates the anomaly until it is reset by the operator. This anomaly may be transmitted by various indicators depending upon the severity of the anomaly. This is typically done by setting given ranges. For example Range A might be reached when ever the fan speed varies by a factor of 10%, Range B may be reached when the fan speed varies by 20%. As higher ranges are reached different levels of of severity may be indicated to user, these ranges may vary greatly depending upon a particular users needs and system tolerance. If power is interrupted to the system, the cooling fan monitor will retain its current state thus, when the power resumes the monitor will resume in the state it was in at the time of the power outage.

The fan speed monitor determines the CPU cooling fan speed by monitoring current glitches (which are a function of rotational fan speed) in the fan current. The glitches interrupt the microcontroller which counts the number of such glitches over a specified period of time to determine the rotational fan speed. The fan current is converted to a voltage by passing it through a resistor in series with the fan. Thus, the current glitches are detected as voltage glitches. These voltage glitches are passed through a comparator circuit, which in turn interrupts the processor.

The present invention is equipped with a series of indicator lights and an audible annunciator which convey the information gathered by the fan speed monitor to the PC user. The speed visual indicators may be red, yellow, and green and indicate the current and past speed of the fan motor since the fan speed monitor was last reset. The operation of the indicator lights and audible annunciator may be typically as follows:

TABLE 1

State Table for the Fan Speed Monitor

| State | Red | Yellow | Green | Annunciator |
|---|---|---|---|---|
| Normal Speed (NS) | off | off | on | off |
| Range - A (RA) | off | on | off | audio on/off |
| Range - B (RB) | on | off | off | on |
| NS was in RA | off | blinking | on | off |
| NS was in RB | blinking | off | on | off |

TABLE 2

Mode Switch functions for the Fan Speed Monitor

| Description | Mode Switch | Indicators |
|---|---|---|
| CM → MM | Press switch for 10 sec. | Cycle: R → Y → G |
| MM → CM | Press switch for 10 sec. | See State Table |
| Reset | Press switch for 1 sec. | See State Table |

CM = Characterization Mode
MM = Monitor Mode

For a better understanding of the present invention reference should be made to the drawings and the description in which there are illustrated and described preferred embodiments of the present invention.

DESCRIPTION OF THE PREFERRED EMBODIMENT

Figure 1:
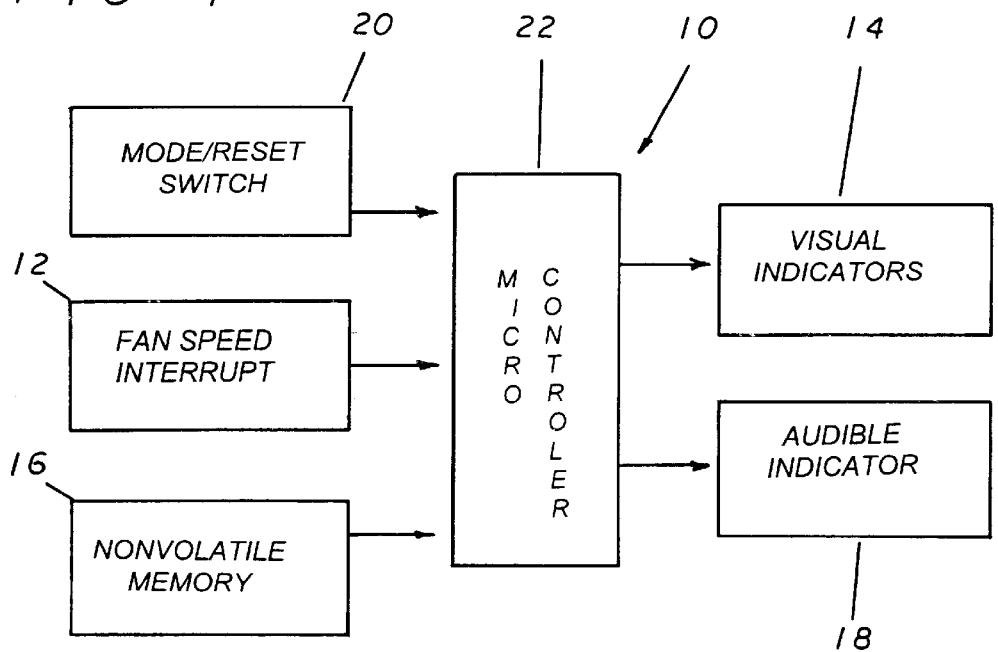
FIG. 1 is a block diagram of the present invention illustrating the manner in which its components work with the microcontroller to monitor and indicate the speed of the CPU cooling fan.

Referring now to the drawings, and more specifically to FIG. 1, the CPU cooling fan speed monitor 10 as illustrated by the block diagram of this Figure is made up of six (6) major parts: the fan speed interrupt 12; the visual indicators 14; the nonvolatile memory 16; the audible indicators 18; the mode/reset switch 20; and the microcontroller 22. This figure illustrates the manner in which the fan speed interrupt 12, the nonvolatile memory 16, and the mode/reset switch 20 transfer information to the microcontroller 22 which in turn processes this information and passes the pertinent processed information to the visual indicators 14 and the audible indicators 18. This configuration provides the PC user with an accurate picture of the state of the CPU cooling fan 24 both during the use of the machine and during periods when the PC was left running but may not have been consistently monitored by an operator.

Figure 2:
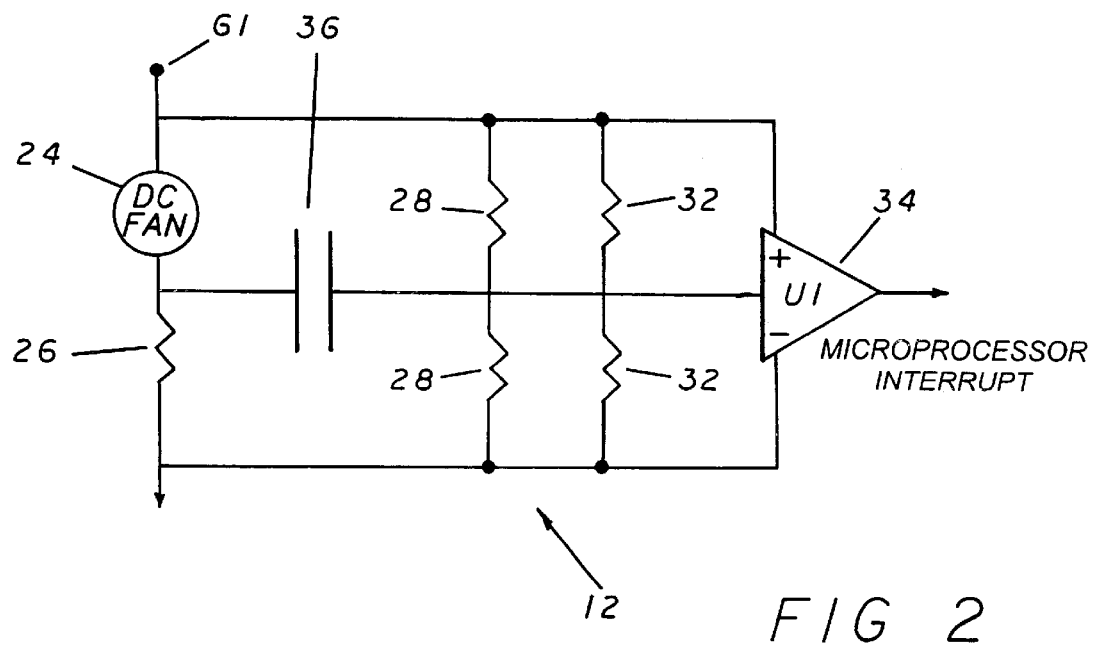
FIG. 2 is a schematic diagram for the microprocessor interrupt signal component of the present invention which is used to determine the CPU cooling fan rotational speed.
Figure 3:
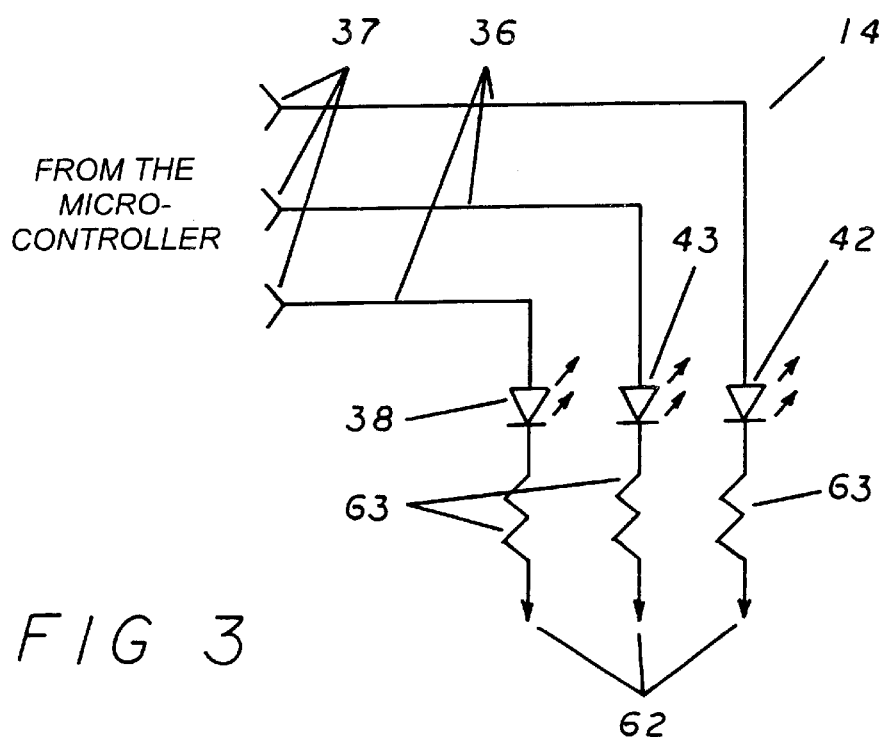
FIG 3 is a schematic diagram for the fan rotational speed visual indicators components of the present invention which convey the state of the cooling fan to the user.
Figure 4:
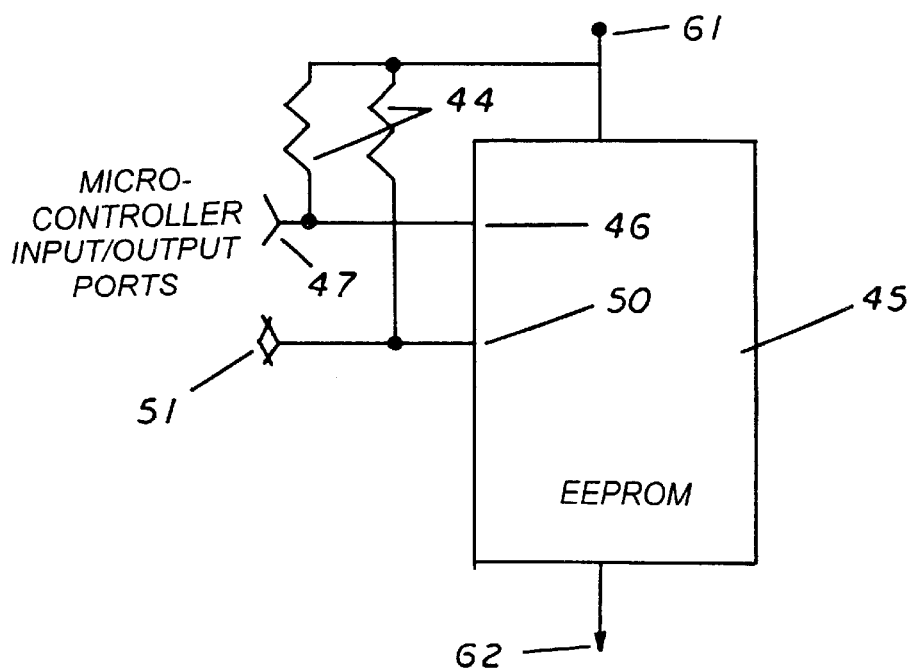
FIG. 4 is a schematic diagram for the nonvolatile memory component of the present invention which is used to store fan speed characterization data.
Figure 5:
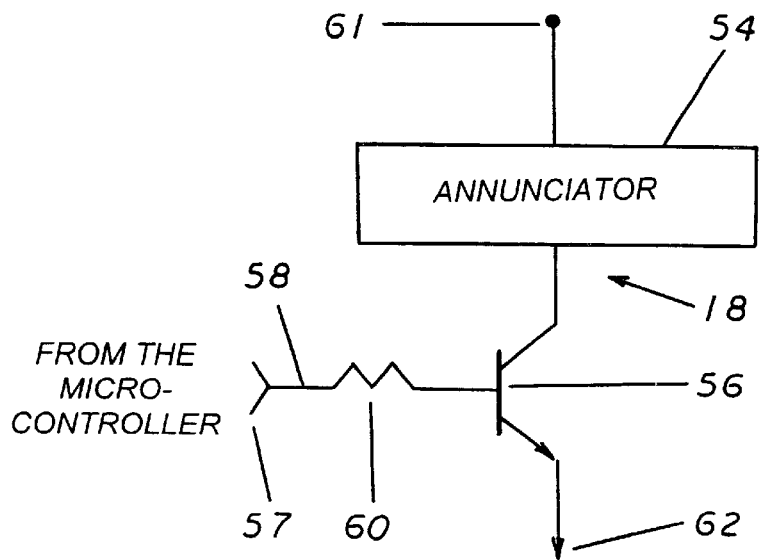
FIG. 5 is a schematic diagram for the audible annunciator component of the present invention.
Figure 6:
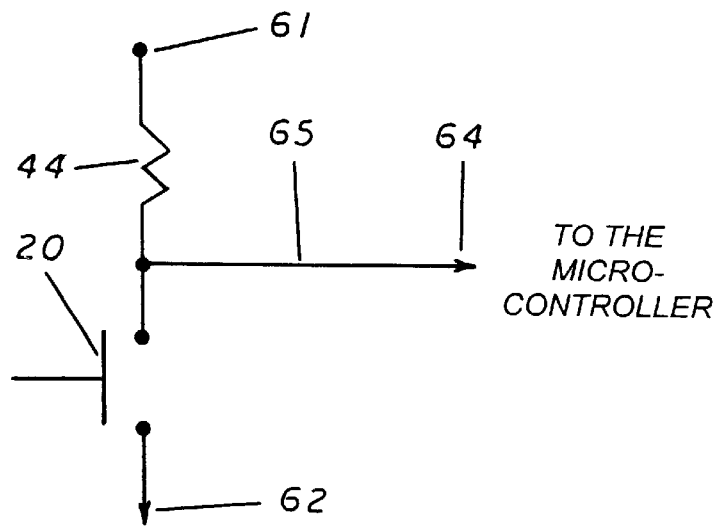
FIG. 6 is a schematic diagram for the mode/reset switch component of the present invention.
Figure 7:
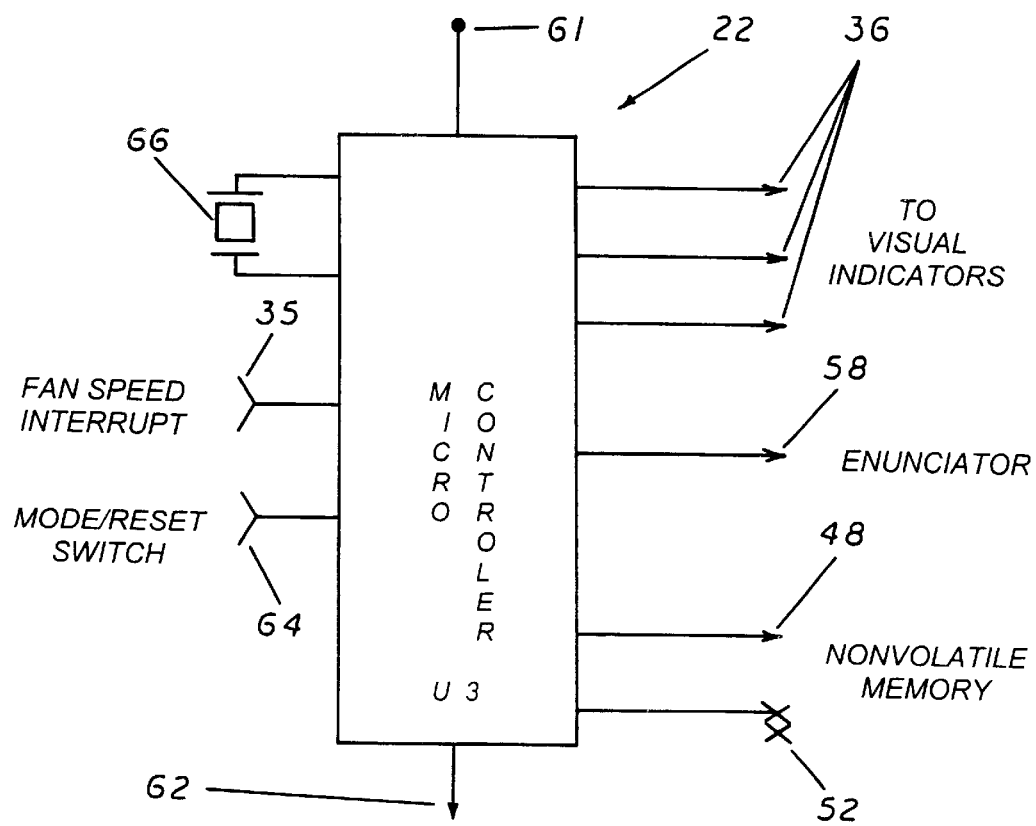
FIG. 7 is a detail diagram of the microcontroller component of the present invention.

The construction of each of the major components of the present invention is further detailed in the additional Figures following FIG. 1. FIG. 2 illustrates the method employed to construct the fan speed interrupt circuit 12. FIG. 3 illustrates the method employed to construct the visual indicators 14 which are used to display to the PC user the current state of the CPU cooling fan 24 speed. FIG. 4 illustrates the method employed to construct the nonvolatile memory 16 which is used to store fan speed characterization data and the current state of the CPU cooling fan 24 speed. FIG. 5 illustrates the method employed to construct the audible indicator 18 which is used to alert the PC user of a fan speed fault. FIG. 6 illustrates the method employed to construct the mode/reset switch 20 which is used to change the modes of operation of the present invention. FIG. 7 illustrates the method employed to construct the microcontroller 22 which is used to control the functioning process of the invention.

As previously stated, the method of construction and the operation of the fan speed interrupt circuit 12 are illustrated in FIG. 2. The fan speed interrupt circuit 12 converts current glitches in the DC current to the CPU cooling fan 24. These current glitches are directly proportional to the rotational speed of the cooling fan 24. The resistor 26, which is located in line between the cooling fan 24 and the voltage comparator 34, is used to convert the fan current glitches to voltage glitches. The DC offset components 28, which are located in line between the resistor 26 and the voltage comparator 34, are used to add a DC offset appearing across the resistor 26 (this occurrence will be referred to as V+). The DC blocking capacitor 30, located in line between the resistor 26 and the DC offset components 28, is used to couple the voltage developed across the resistor 26 to the DC voltage across the DC offset components 28. The DC voltage referencer 32, located in line between the DC offset components 28 and the voltage comparator 34, provide as voltage reference to the voltage comparator 34 (this will be referred to as V−). The voltage comparator 34 compares the V+ to the V− and produces short duration voltage pulses (compatible with the microcontroller 22 logic levels) which are used to interrupt the microcontroller 22. This information is passed from the voltage comparator 34 to the microcontroller 22 through the fan interrupt input/output port 35. The microcontroller 22 counts these voltage pulses over a fixed period of time interval to obtain a measurement which is proportional to the rotational speed of the CPU cooling fan 24.

The manner of construction and the method of operation of the visual indicator 14 component of the present invention are detailed in FIG. 3. The visual indicator 14 is the component of the invention which conveys a visual signal to the operator of a PC which illustrates the operating status of the CPU cooling fan 24. The visual indicator 14 operates by the use of a plurality of indicator lights: the red indicator light 38; the yellow indicator light 40; and the green indicator light 42. These indicator lights are connected to the microcontroller 22 by the use of the three light electrical leads 36 which transfer the data processed in the microcontroller 22 through the indicator light input/output ports 37. Each of the indicator light circuits has a current limiting resistor 63 which terminate at the grounds 62 to complete the individual circuits.

The manner of construction and the method of operation of the nonvolatile memory circuit 16 are illustrated in FIG. 4. The nonvolatile memory circuit 16 is a serial electrically erasable programmable read only memory (EEPROM) 45 which retains the data programed into it even during power outages. This ensures that the data is safe guarded in the event that the electrical power to the circuit is lost for any reason.

This component of the present invention is also equipped with a plurality of passive pull-up resistors 44 which function for the open drain transistors (not shown) on the microcontroller 22.

The nonvolatile memory 16 is connected to the serial clock 46 through the serial clock input/output port 47 of the microcontroller 22 by the use of the serial clock feed line 48. The serial clock 46 provides the signal to clock the data into the serial EEPROM 45 where the data is retained.

Finally, the nonvolatile memory is also connected to serial data 50 through the serial data input/output port 51 of the microcontroller 22 by the use of the serial data feed line 52. The serial data input/output port 51 serves to provide the data programed into the serial EEPROM 45 and read from the serial EEPROM 45.

The manner of construction for the audible indicator 18 is illustrated in FIG. 5. The audible indicator 18 is the component of the present invention which supplies an audible warning of CPU cooling fan 24 problems to the user of the PC. The major component of the audible indicator 18 is the annunciator 54 which supplies the audible signal and can be made of a speaker, buzzer, or other similar device. The electrical current necessary to operate the annunciator 54 is supplied by the current drive 56 which is connected to the current drive input/output port 57 of the microcontroller 22 by the means of the current drive feed line 58. Additionally, there is a current limit resistor 60 in the current drive feed line 58 between the microcontroller 22 and the current drive 56 which provides the necessary drive current for the annunciator 54.

The manner of construction of the mode/reset switch 20 is illustrated in FIG. 6. The mode/reset switch is the component of the present invention which allows an operator of a PC to reset the system after it has detected an operating error in the CPU cooling fan 22. The mode/reset switch 20 is a normally open push-button switch. When the mode/reset switch 20 is open, the microcontroller 22 receives a logic-1 (high voltage) at its switch input port 64 by means of the switch feed line 65 through the passive pull-up resistor 44. Conversely, when the mode/reset switch 20 is closed, the microcontroller 22 receives a logic-0 (low voltage) at its switch input port 64 by means of the switch feed line 65 through the passive pull-up resistors 44. This operates to provide the requisite logic states for the microcontroller 22.

The construction of the microcontroller 22 is illustrated in FIG. 7. The microcontroller 22 contains all of the input/output ports, interval timers, program and data memory, and interrupt control circuitry on a single monolithic integrated circuit. The microcontroller 22 is also equipped with a instruction cycle timer 66 which controls the cycle time of the microcontroller 22. Additionally, this figure also illustrates the manner in which the other components of the invention are connected to the microcontroller 22 to both receive raw information and transmit processed information to these other components.

Figure 8:
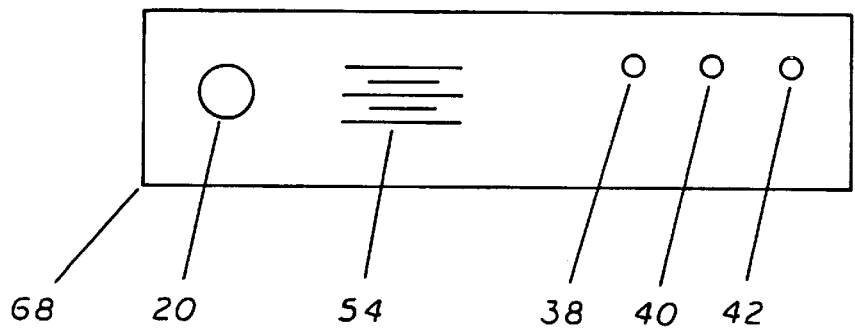
FIG. 8 is an illustration of the control panel of the CPU cooling fan speed monitor.

Finally, FIG. 8 is an illustration of the control panel 68 of the CPU cooling fan Speed monitor 10. The control panel 68 houses the mode/reset switch 20, the annunciator 54 of the audible indicator 18, and the red, yellow, and green indicator lights, 38, 40 and 42, of the visual indicator 14. The control panel 68 functions as the point at which the controls and indicator systems are mounted to give the operator the necessary feedback.

Although the present invention has been described in considerable detail with reference to certain preferred versions thereof, other versions are possible for example the indicator means and programming of the normal operating windows could vary greatly, Therefore, the spirit and scope of the appended claims should not be limited to the description of the preferred versions contained herein.

What is claimed is:

1. A fan speed failure detector comprising:
   a fan speed sensor providing a first output voltage proportional to the fan speed;
   a second reference voltage;
   a comparator for comparing these voltages and producing voltage pulses;
   a microcontroller for reading said voltage pulses and obtaining a rotational speed of said fan;
   a first adaptive mode for using said fan speed to obtain a normal operating window for said fan speed;
   a second characterization mode for comparing said fan speed to said normal operating window;
   an indicator for indicating whether said fan speed is in or out of said fan speeds set operating window; and
   a memory for recording when said fan speed is out of sais fan speeds operating window.

2. A fan speed failure detector as in claim 1 further comprising a switch for moving between said first adaptive mode and said second characterization mode.

3. A fan speed failure detector as in claim 2 wherein said memory is electrically erasable programable read only memory.

4. A fan speed failure detector as in claim 3 further comprising various ranges outside of said fan speeds operating window for indicating various levels of fan failure.

5. A fan speed failure detector as in claim 4 wherein said indicator is a series of lights.

6. A fan speed failure detector as in claim 4 wherein said indicator is an annunciator.

7. A fan speed failure detector as in claim 4 wherein said indicator is an annunciator in combination with a series of lights.

8. An adaptive fan speed failure detector comprising:
   a fan speed sensor providing a first output voltage proportional to the fan speed;
   a second reference voltage;
   a comparator for comparing these voltages and producing voltage pulses;
   a microcontroller for reading said voltage pulses and obtaining a rotational speed of said fan;
   a first adaptive mode for using said fan speed to obtain a normal operating window for said fan speed;
   a second characterization mode for comparing said fan speed to said normal operating window;
   a switch for moving between said first adaptive mode and said second characterization mode;
   an indicator for indicating when said fan speed is in or out of said fan speeds normal operating window; and
   a memory for recording when said fan speed is out of said fan speeds normal operating window and for storing said operating window fan speeds.

9. An adaptive fan speed failure detector as in claim 8 wherein said memory is electrically erasable programable read only memory.

10. An adaptive fans speed failure detector as in claim 9 further comprising a manual switch for resetting said memory.

11. An adaptive fan speed failure detector as in claim 10 further comprising various ranges outside of said fan speeds operating window for measuring various levels of fan failure.

12. An adaptive fan speed failure detector as in claim 11 wherein said indicator is a series of lights.

13. An adaptive fan speed failure detector as in claim 11 wherein said indicator is an annunciator.

14. An adaptive fan speed failure detector as in claim 11 wherein said indicator is an annunciator in combination with a series of lights.

15. A method of measuring a CPU cooling fans normal operating window and of reporting when said fan is operating outside of said window comprising the steps of;
   A. entering an adaptive mode for obtaining the CPU cooling fans speed over time and setting a normal operating window for said CPU cooling fans speed;
   A1. entering a monitor mode;
   B. obtaining the CPU cooling fans speed;
   C. comparing said CPU cooling fans speed to said normal operating window;
   D. indicating whether said cooling fans speed inside or outside of said normal operating window;
   E. saving the indication of said cooling fans speed when it is outside of said normal operating window until said indication is reset; and F. repeating steps B through E.

16. A method of measuring a CPU cooling fans normal operating window and of reporting when said fan is operating outside of said window as in claim 15 wherein step A further comprises the steps of;

G. measuring the operating speed of said CPU cooling fans speed over time;

H. developing a operating window of said CPU cooling fans speed; and

I. setting various acceptable and unacceptable ranges for said CPU cooling fans speed based upon said operating window.

\* \* \* \* \*